(12) United States Patent
Steele et al.

(10) Patent No.: US 8,344,252 B2
(45) Date of Patent: Jan. 1, 2013

(54) CABLE SPLICE CONNECTION ASSEMBLY

(75) Inventors: James Steele, Seattle, WA (US);
William R. Stagi, Burien, WA (US)

(73) Assignee: UTILX Corporation, Kent, WA (US)

( * ) Notice: Subject to any disclaimer, the term of this patent is extended or adjusted under 35 U.S.C. 154(b) by 476 days.

(21) Appl. No.: 12/544,991

(22) Filed: Aug. 20, 2009

(65) Prior Publication Data

US 2010/0059275 A1   Mar. 11, 2010

Related U.S. Application Data

(60) Provisional application No. 61/090,503, filed on Aug. 20, 2008.

(51) Int. Cl.
*H01R 4/00* (2006.01)
(52) U.S. Cl. .................................... 174/84 R
(58) Field of Classification Search ............... 174/74 R, 174/78, 84 R, 84 C, 88
See application file for complete search history.

(56) References Cited

U.S. PATENT DOCUMENTS

| | | | |
|---|---|---|---|
| 1,646,660 A * | 10/1927 | Prince | 439/805 |
| 2,313,780 A | 3/1943 | Snyder | |
| 2,331,615 A | 10/1943 | Meyer | |
| 2,466,997 A | 4/1949 | Morris | |
| 2,579,529 A | 12/1951 | Woodling | |
| 2,581,500 A | 1/1952 | Schoonmaker | |
| 2,581,655 A | 1/1952 | Harden | |
| 3,444,505 A | 5/1969 | Becker | |
| 3,593,415 A | 7/1971 | Wofford | |
| 3,810,078 A | 5/1974 | Chordas | |
| 3,961,127 A | 6/1976 | Gear, Jr. | |
| 4,607,469 A | 8/1986 | Harrison | |
| 4,752,252 A | 6/1988 | Cherry | |
| 4,927,386 A | 5/1990 | Neuroth | |
| 5,854,444 A | 12/1998 | Fehlhaber | |
| 5,907,128 A | 5/1999 | Lanan | |
| 7,074,064 B2 | 7/2006 | Wallace | |
| 7,344,396 B2 | 3/2008 | Stagi | |
| 7,544,105 B2 * | 6/2009 | Stagi et al. | 439/784 |
| 7,621,767 B2 | 11/2009 | Stagi | |
| 7,658,629 B2 | 2/2010 | Stagi | |
| 2002/0046865 A1 | 4/2002 | Bertini | |
| 2006/0231283 A1 * | 10/2006 | Stagi et al. | 174/84 R |
| 2007/0049085 A1 | 3/2007 | Stagi | |
| 2007/0054563 A1 * | 3/2007 | Stagi et al. | 439/790 |
| 2008/0124962 A1 | 5/2008 | Stagi | |
| 2008/0156508 A1 | 7/2008 | Stagi | |
| 2009/0209141 A1 * | 8/2009 | Stagi et al. | 439/784 |
| 2009/0246995 A1 * | 10/2009 | Stagi et al. | 439/201 |

OTHER PUBLICATIONS

Office Action dated Feb. 25, 2010, from U.S. Appl. No. 12/544,985, filed Aug. 20, 2009.

* cited by examiner

*Primary Examiner* — William Mayo, III
(74) *Attorney, Agent, or Firm* — Christensen O'Connor Johnson Kindness PLLC

(57) ABSTRACT

A cable splice connection assembly for coupling a first cable to a second cable generally includes a main body having first and second ends and defining an inner cavity, the first end configured to receive at least a portion of a first cable therein, and the second end configured to receive at least a portion of a second cable therein, and a first engagement mechanism configured to couple the main body to a first cable wherein the first engagement mechanism includes a cable seal, wherein the cable seal includes an adhesive seal.

19 Claims, 9 Drawing Sheets

CABLE SPLICE CONNECTION ASSEMBLY

CROSS-REFERENCES TO RELATED APPLICATIONS

This application claims the benefit of U.S. Provisional Application No. 61/090,503, filed on Aug. 20, 2008, the disclosure of which is hereby expressly incorporated by reference. This application is related to U.S. patent application Ser. No. 12/544,985, filed on Aug. 20, 2009, which claims the benefit of U.S. Provisional Application No. 61/090,557, filed on Aug. 20, 2008.

BACKGROUND

Typical cables include a conductor, such as a number of copper or aluminum strands, surrounded by an insulation layer. In some instances, the life span of a cable is shortened when water enters the cable and forms micro-voids in the insulation layer around ionic contaminants. These microvoids spread throughout the insulation layer in a tree like shape, collections of which are sometimes referred to as water trees.

Water trees are known to form in the insulation layer of electrical cables when medium or high voltage is applied to the cable in the presence of water and ions. As water trees grow, they compromise the dielectric properties of the insulation layer until failure occurs. Many large water trees initiate at the site of an imperfection or a contaminant, but contamination is not a necessary condition for water trees to propagate.

Water tree growth can be eliminated or retarded by removing or minimizing the water or ions, or by reducing the voltage stress. Another approach requires the injection of a dielectric enhancement fluid into interstices located between the strands of the cable. However, when a dielectric enhancement fluid, or any other fluid such as strand blocking fluid, etc., is injected into the cable, it can leak from the cable, particularly during heat cycling. In that regard, during heat cycling, the insulation layer becomes soft and releases its tension on sealing devices, such as O-ring seals, in the cable connection assembly. As the tension is released, the seals may fail and allow dielectric enhancement fluid to leak from the cable.

Accordingly, there exists a need for cable connection assemblies having improved seals to decrease leak points of injected fluid from the insulation layer. Such improved seals may also decrease water entry points into the cable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a cable splice connection assembly for coupling a first cable to a second cable is provided. The cable connection assembly generally includes a main body having first and second ends and defining an inner cavity, the first end configured to receive at least a portion of a first cable therein, and the second end configured to receive at least a portion of a second cable therein. The assembly further includes a first engagement mechanism configured to couple the main body to a first cable wherein the first engagement mechanism includes a cable seal, wherein the cable seal includes an adhesive seal.

In accordance with another embodiment of the present disclosure, a cable splice connection assembly for coupling a first cable to a second cable is provided. The cable connection assembly generally includes a main body defining an inner cavity having first and second ends, the first end configured to receive at least a portion of a first cable therein, and the second end configured to receive at least a portion of a second cable therein. The assembly further includes a first engagement mechanism configured to couple the main body to the first cable, wherein the first engagement mechanism includes a first adhesive seal, wherein the adhesive of the first adhesive seal is selected from the group consisting of acrylic, epoxy, structural, temperature resistant, thermosetting adhesives, and a second engagement mechanism configured to couple the main body to the second cable, wherein the second engagement mechanism includes a second adhesive seal, wherein the adhesive of the second adhesive seal is selected from the group consisting of acrylic, epoxy, structural, temperature resistant, thermosetting adhesives.

In accordance with another embodiment of the present disclosure, a method for coupling a first cable to a second cable is provided. The method generally includes providing a cable connection assembly including a main body defining an inner cavity having first and second ends, the first end configured to receive at least a portion of a first cable therein, and the second end configured to receive at least a portion of a second cable therein. The method further includes providing the first cable having a first end, providing the second cable having a first end, inserting the first end of the first cable into the first end of the inner cavity of the main body and inserting the first end of the second cable into the second end of the inner cavity of the main body, and sealing the first end of the first cable in the first end of the inner cavity of the main body using an adhesive and sealing the first end of the second cable in the second end of the inner cavity of the main body using an adhesive.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Figure 1:
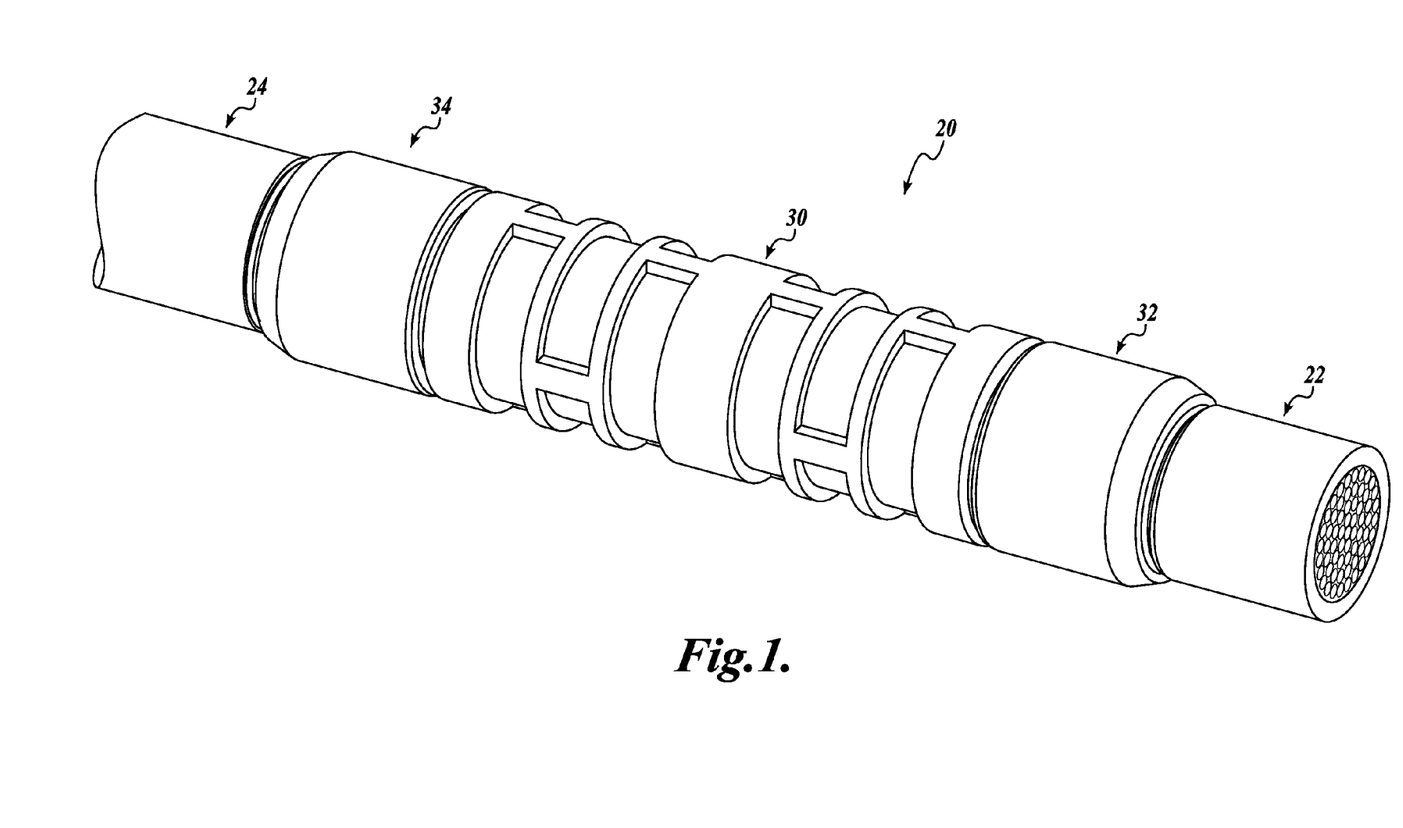
FIG. 1 is a perspective view of one embodiment of a cable splice connection assembly formed in accordance with the present disclosure.
Figure 2:
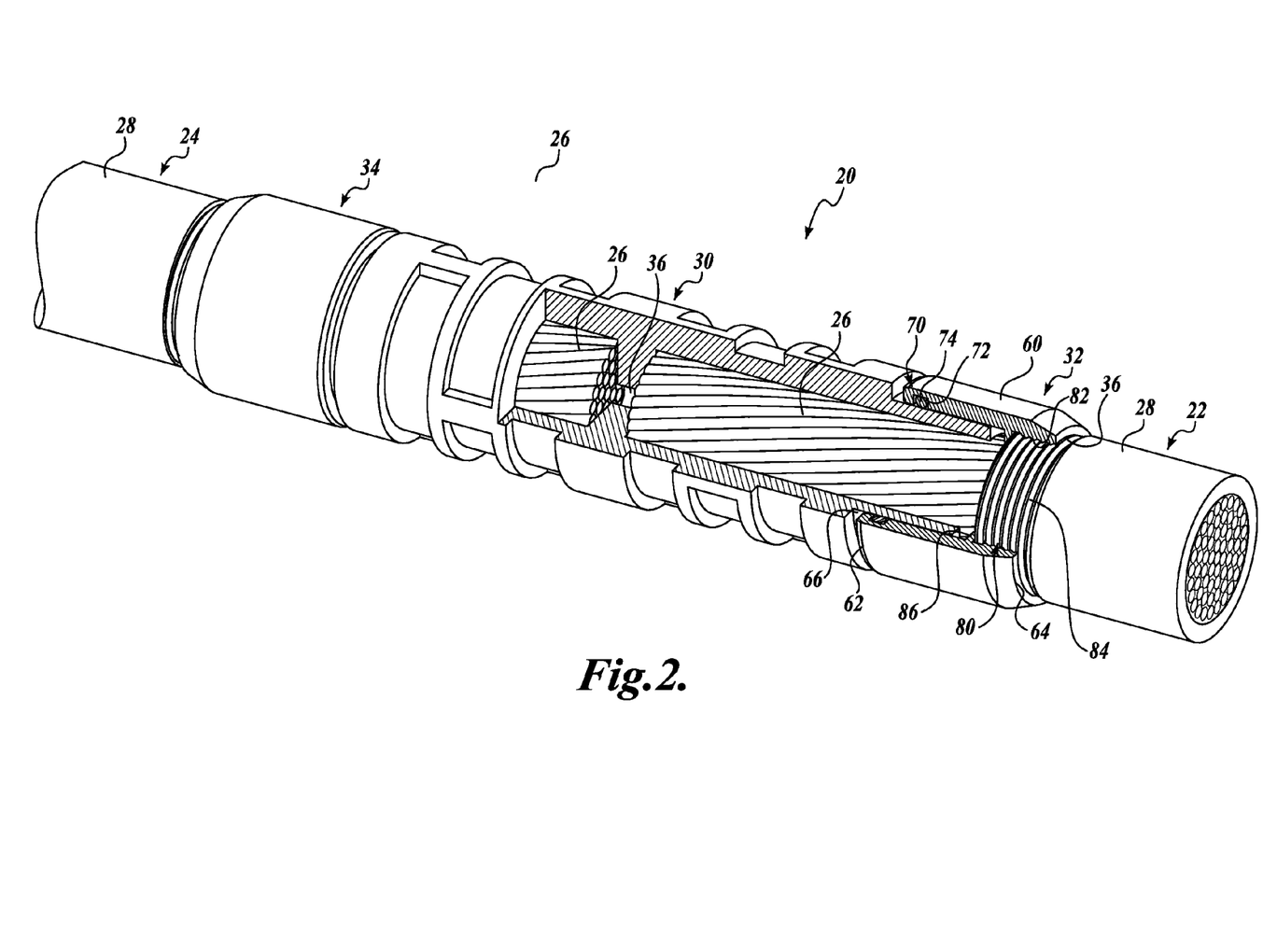
FIG. 2 is a perspective, partial cut-away view of the cable splice connection assembly of FIG. 1, having sealing mechanisms formed in accordance with one embodiment of the present disclosure.
Figure 3:
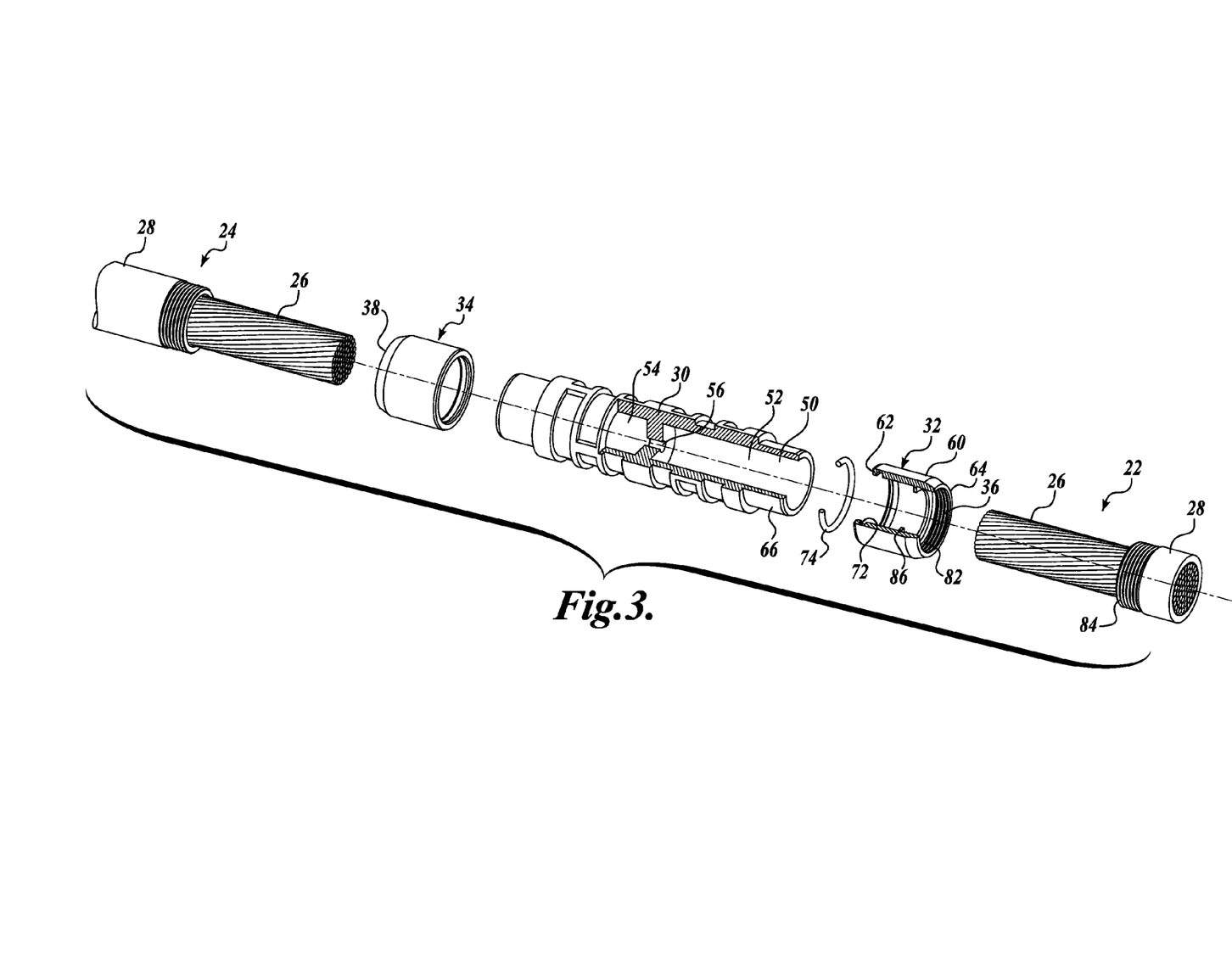
FIG. 3 is an exploded, partial cut-away view of the cable splice connection assembly of FIG. 1.

Referring to FIGS. 1-3, one embodiment of a cable splice connection assembly 20 formed in accordance with the present disclosure is shown. Generally described, the connection assembly 20 is adapted to electrically couple two cables 22 and 24 together, while permitting a fluid, one suitable example being a restorative fluid, such as a dielectric enhancement fluid, to be injected into the first and/or second cables 22 and 24.

First and second cables 22 and 24 may be any well known or to-be-developed cables, such as the cables illustrated, each having a plurality of conductors 26 surrounded by an insulation layer 28. It should be appreciated that any suitable cables may be used. The insulation layer 28 may include layers of materials to accommodate electrical stress grading and shielding, as desired. Because the first and second cables 22 and 24 are substantially similar, the description of the cables that follows focuses primarily on first cable 22 and its connection to the assembly 20.

The cable connection assembly 20 includes a main body 30, shown as a sleeve or crimp connector, disposed between first and second cable receiving ends 32 and 34, shown as collar assemblies. The main body 30 is suitably a cylindrically shaped structure defining an inner cavity 50 having first and second compartments 52 and 54 (see FIG. 3). The first and second compartments 52 and 54 of the inner cavity 50 are sized and shaped to receive at least a portion of the first cable 22 and at least a portion of the second cable 24. Further, the inner cavity 50 is adapted to receive the fluid mentioned above for treating the first and second cables 22 and 24, as described in greater detail below. In that regard, the cable connection assembly 20 may further include one or more valve assemblies (not shown) for receiving and delivering fluid to the first and second cables 22 and 24. A channel 56 between the first and second compartments 52 and 54 of the inner cavity 50 allows fluid to flow between the conductors 26 of the first and second cables 22 and 24 after the fluid has been introduced into the cable assembly 20.

The first and second collar assemblies 32 and 34 include first and second open ends 36 and 38 (see FIG. 3). At least a portion of the first end of the first cable 22 is receivable within the first open end 36 of the assembly 20 and at least a portion of the second cable 24 is receivable within the second open end 38 of the connection assembly 20. Although the first and second cable receiving ends 32 and 34 are shown as collar assemblies in the illustrated embodiment, it should be appreciated that the first and second cables 22 and 24 may attach directly to the main body 30. As described in greater detail below, the connection assembly 20 may include sealing mechanisms for minimizing fluid leakage, as well as for preventing water ingress into the connection assembly 20.

The first and second collar assemblies 32 and 34 are designed and configured to secure the first and second lengths of cable 22 and 24 to the main body 30 to enable a user to splice the first cable 22 to the second cable 24. The collar assemblies 32 and 34 are substantially similar in design and function, and therefore, only the first collar assembly 32 will be hereinafter described in detail. The first collar assembly 32 includes a first collar 60 having first and second ends 62 and 64, and is designed and configured to be received on the exterior of the main body 30. In the regard, the first collar 60 is shown in the illustrated embodiment as being receivable in an annular exterior groove 66 on the outer surface of the main body 30.

The first collar 60 includes a collar sealing mechanism or collar seal 70 for sealing the first collar 60 on the main body 30. In the illustrated embodiment of FIGS. 1-3, the collar seal 70 includes interior annular groove 72 near the first end 62 of the first collar 60 suitable to receive an O-ring seal 74 or another suitable seal therein. When the collar seal 70 is assembled, the O-ring seal 74 protrudes from the annular groove 72 to be disposed between the interior of the first collar 60 and the exterior surface of the main body 30 to form a fluid tight seal therebetween. It should be appreciated that the collar seal 70 may alternately include an exterior annular groove on the main body 30 and an O-ring seal disposed therein. It should further be appreciated that the collar seal 70 may also include an adhesive for an improved seal between the interior of the first collar 60 and the exterior surface of the main body 30. Suitable adhesives are described in greater detail below.

The second end 64 of the first collar 60 includes a first cable engagement mechanism 80 for engaging the first cable 22 in the first open end 36 of the assembly 20. In one embodiment, the first engagement mechanism 80 may be a releasable engagement mechanism. In another embodiment, the first engagement mechanism 80 may be a permanent engagement mechanism. In the illustrated embodiment, the first engagement mechanism 80 includes a threaded portion or threaded bore 82 that has internal threads disposed upon an inner surface of the main body 30. The threaded bore 82 is configured to engage corresponding threads 84 disposed on an external surface of the insulation layer 28 of the first cable 22.

Although the first engagement mechanism 80 is illustrated and described as utilizing threads to couple the cable connection assembly 20 to the cable 22, the engagement mechanism 80 may use various other means for coupling the cable connection assembly 20 to the cable 22, a few suitable non-limiting examples being mechanical fasteners, self tapping threads, push on style barbed fittings, ferrule style connectors, quick-to-connect devices, crimping devices, and adhesives that are capable of holding cable 22 in contact with main body 30.

The first engagement mechanism 80 also may include a cable sealing mechanism or cable seal. Specifically, an adhesive (not shown) is applied to the threaded connection to form a fluid-tight seal between the first collar assembly 32 and the insulation layer 28 when the adhesive cures. In that regard, the threaded bore 82 of the first collar assembly 32 may include an annular groove 86 at the end of the threaded bore 82 for containing any excess adhesive that might pool in the first collar assembly 32 or the main body 30. Rather than an annular groove 86, the first collar assembly 32 may also include a partial annular groove, a thread, or a roughened surface having increased surface area for improved adhesion and/or for containing any excess adhesive that might pool in the first collar assembly 32 or the main body 30.

The adhesive may be applied to either or both of the threaded bore 82 or on the threaded external surface 84 of the insulation layer 28 of the first cable 22 before the first cable 22 is coupled to the first collar assembly 32 or the connection assembly 20. Moreover, the adhesive may be applied (or reapplied) after the first cable 22 and the first collar 32 have been coupled to one another, for example, through an adhesive inlet port 878 in the first collar assembly 832 (see, e.g., FIG. 8).

In another non-limiting example the adhesive may be used as both the engagement mechanism 80 and the cable sealing mechanism. In this example, the bore 82 and the external surface 84 of the insulation layer 28 of the cable 22 would not be threaded, but may include roughened sealing surfaces to improve the engagement and sealing capabilities of the adhesive.

Figure 9:
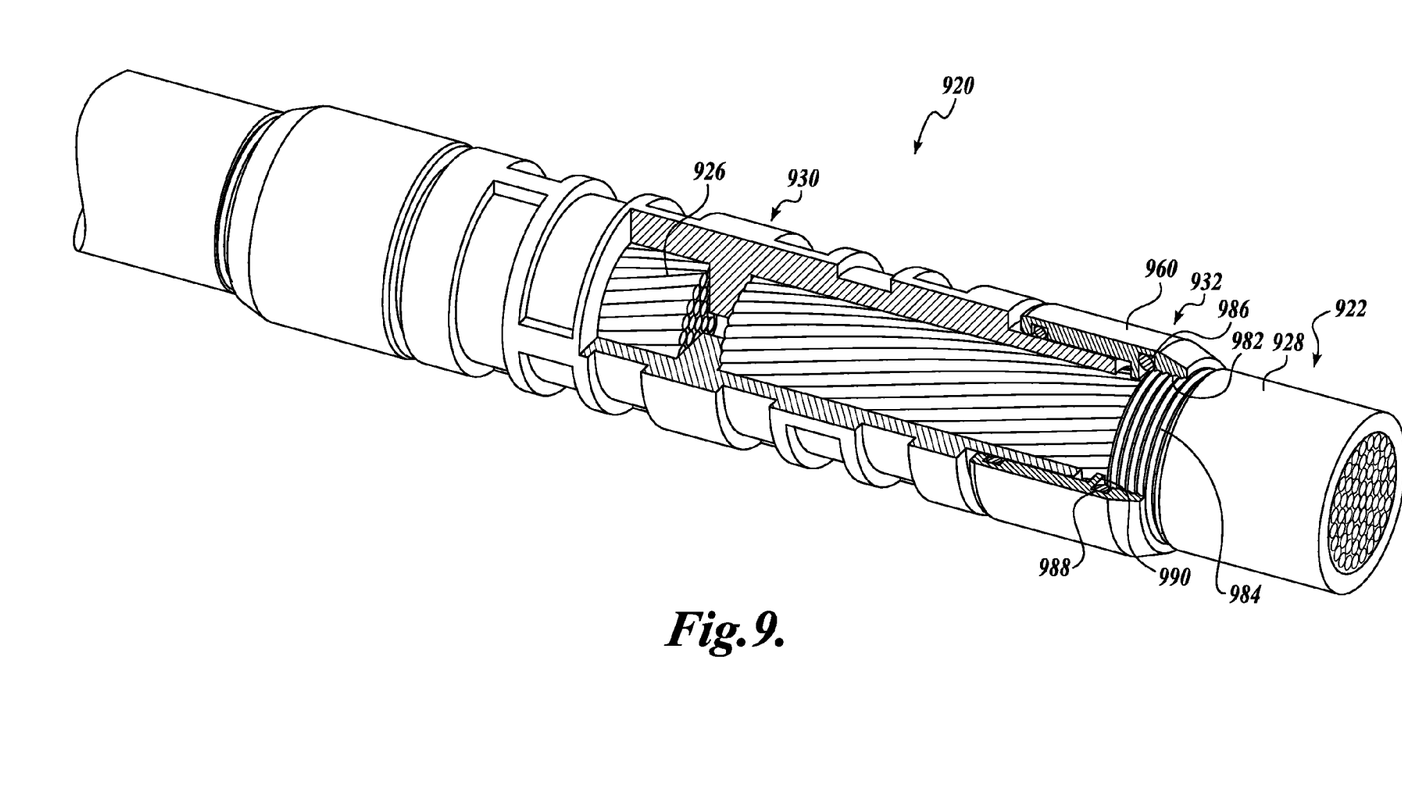
FIG. 9 is a perspective, partial cut-away view of a prior art cable splice connection assembly.

In prior art designs (see FIG. 9) an O-ring seal 988 was positioned in an annular groove 986 at the end of the threaded bore 982 to form a fluid-tight seal between the connection assembly 920 and the insulation layer 928. When threaded to the first collar assembly 932, the insulation layer 928 put compression on the seal 988 to sandwich the seal 988 against annular shoulder 990 of threaded bore 982. During heat cycling, however, the insulation layer 928 can become soft and release its compression on seal 988. As the compression is released, the seal 988 may fail and allow dielectric enhancement fluid to leak from the cable 922.

To address this problem with prior art designs, the adhesive seal of the present disclosure maintains a reliable seal between the insulation layer 28 and the first collar assembly 32, particularly during heat cycling. In that regard, the adhesive seal fills in gaps between the threads of both the first collar assembly 32 and the insulation layer 28 to provide enhanced mechanical strength to the first engagement mechanism 80. Specifically, the adhesive seal can be maintained during dynamic changes, such as thermal changes, as a result of the gap filling properties of the adhesive. In addition to an adhesive seal, it should be appreciated the first engagement mechanism 80 may or may not include an additional seal, such as an O-ring seal, sandwiched between the insulation layer 28 and annular shoulder 86 of threaded bore 82.

Any suitable adhesive now known or to be developed for forming a fluid tight seal between components of the connection assembly 20 or between the connection assembly 20 and the insulation layer 28 may be used. The adhesive is designed to fill the gaps, for example, between the main body 30 and the insulation layer 28 to provide enhanced mechanical strength to the first engagement mechanism 80. In a preferable embodiment, the adhesive has heat resistance of at least 130 degrees Celsius, so that the adhesive will hold its mechanical strength during heat cycling. In another embodiment, the adhesive has suitable chemical resistance and bond strength required for the application.

In a non-limiting example, the adhesive is a curing adhesive. In other non-limiting examples, the adhesive is selected from the following groups of adhesives: acrylic, epoxy, structural, temperature resistant, thermosetting, etc. In yet another non-limiting example, the adhesive is a structural adhesive, for example, made by 3M™ under the brand name SCOTCH-WELD™, such as an acrylic structural plastic adhesive under the brand name 3M™ DP8005 and a curing flexible epoxy resin system under the brand name RELTEK™ BONDIT™ B-45TH.

It should be appreciated that the specific type of adhesive used may depend on the construction of the cable 22. For example, in one embodiment of the present disclosure, the cable insulation layer 28 is made from polyethylene, and the adhesive is any suitable adhesive cable of bonding to a polyethylene. In other embodiments of the present disclosure, the cable insulation layer 28 may be made from ethylene propylene rubber, polyvinyl chloride, etc. In those embodiments, the adhesive is any suitable adhesive cable of bonding to the various materials.

The engagement of the second cable 24 at the second open end 38 of the connection assembly 20 may be substantially similar to the engagement of the first cable 22, and therefore, will not be described in greater detail.

As mentioned above, valve assemblies (not shown) may be included in the main body 30 to allow a fluid, one suitable example being a restorative fluid, such as a dielectric enhancement fluid, to be injected into the first and second cables 22 and 24. In that regard, the valve assemblies may include one or more inlet ports that pass through the first collar and/or the main body 30 to permit fluid to pass into the respective first and second compartments 52 and 54 of the inner cavity 50 of the main body 30, for example, in a radial direction. Various valve assemblies are known in the art. In one suitable embodiment, the valve assembly of the present disclosure may be substantially similar to the valve assembly described in U.S. Pat. No. 7,344,396, filed on Aug. 23, 2005, entitled "Cable Connection Assembly," the disclosure of which is hereby expressly incorporated by reference. Thus, for the sake of brevity, valve assemblies will not hereinafter be described in detail.

In light of the above description of the components of the cable connection assembly 20, a method for coupling a first cable 22 to a second cable 24 using the cable connection assembly 20 will now be described. Referring to FIG. 3, prior to installation, the insulation layers 28 of the cables 22 and 24 may be cut back exposing the conductors 26. The insulation layers 28 may then be threaded to form external threads 84 sized and shaped, for example, to interface with the threaded bore 82 of the first collar assembly 32. The collar assemblies 32 and 34 are then attached the first and second cables 22 and 24 by being threaded onto the first ends of the first and second cables 22 and 24.

As discussed above, adhesive is applied to the threaded connections either before or after the cables are inserted into the inner cavity 50 of the connection assembly 20. The adhesive may also be applied to the threaded connections both before and after the cable is inserted into the inner cavity 50 of the connection assembly 20.

The collar assemblies 32 and 34 are then attached to the main body 30. The collar assemblies 32 and 34 include collar seals 70, which may or may not include an adhesive seal. In that regard, the adhesive may be applied to the threaded connections both before and after the collar assemblies 32 and 34 are attached to the main body 30.

Referring to FIGS. 4-8, alternate embodiments of cable connection assemblies formed in accordance with the present disclosure are illustrated. The cable connection assemblies of these alternate embodiments are substantially similar in construction and operation to the cable connection assembly 20 of FIGS. 1-3 described above. Therefore, for the sake of brevity, this detailed description will focus upon the aspects of the cable connection assemblies of FIGS. 4-8 which depart from the previously described embodiment in the construction and operation of the first and second engagement mechanisms.

Figure 4:
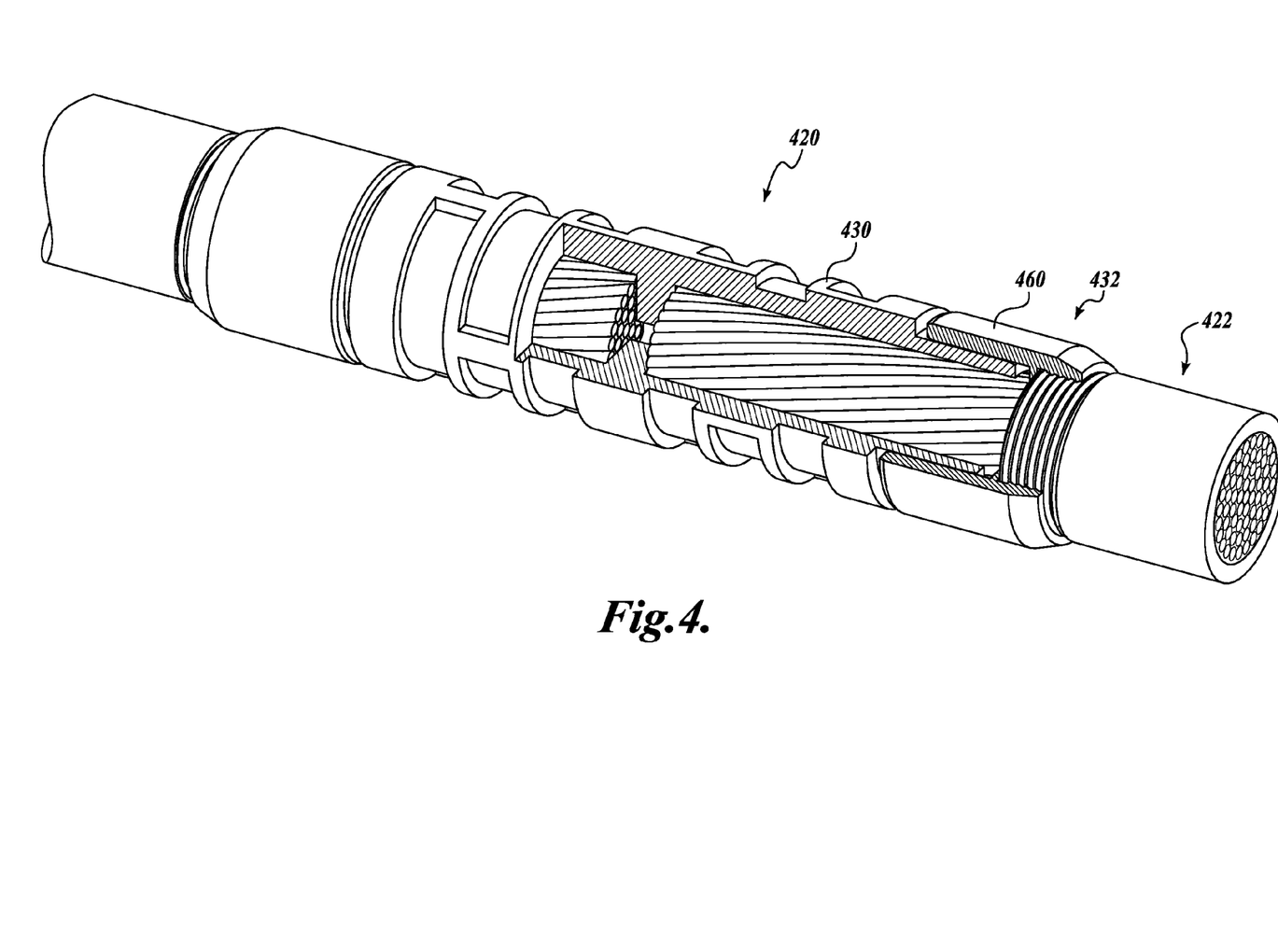
FIG. 4 is a perspective, partial cut-away view of a second embodiment of a cable splice connection assembly formed in accordance with the present disclosure, having sealing mechanisms formed in accordance with a second embodiment of the present disclosure.

FIG. 4 depicts a second embodiment of a cable splice connection assembly 420 shown in partial cross-section. The assembly 420 is substantially identical to the assembly 20 described above with reference to FIGS. 1-3, except for the differences hereinafter described with reference to the first collar assembly 432. The first collar assembly 432 does not include an interior annular groove for receiving an O-ring. Rather, a suitable adhesive is applied to the exterior of the main body 430 and/or the interior of the first collar 460 to form a seal therebetween when first collar 460 is received on the main body 430 and the adhesive cures. It should be appreciated that either the inner surface of the main body 430 or the outer surface of the first collar 460 may include a roughened surface having increased surface area for improved adhesion. As described above, any suitable adhesive now known or to be developed for forming a fluid tight seal between the main body 430 and the first collar 460 may be used.

Figure 5:
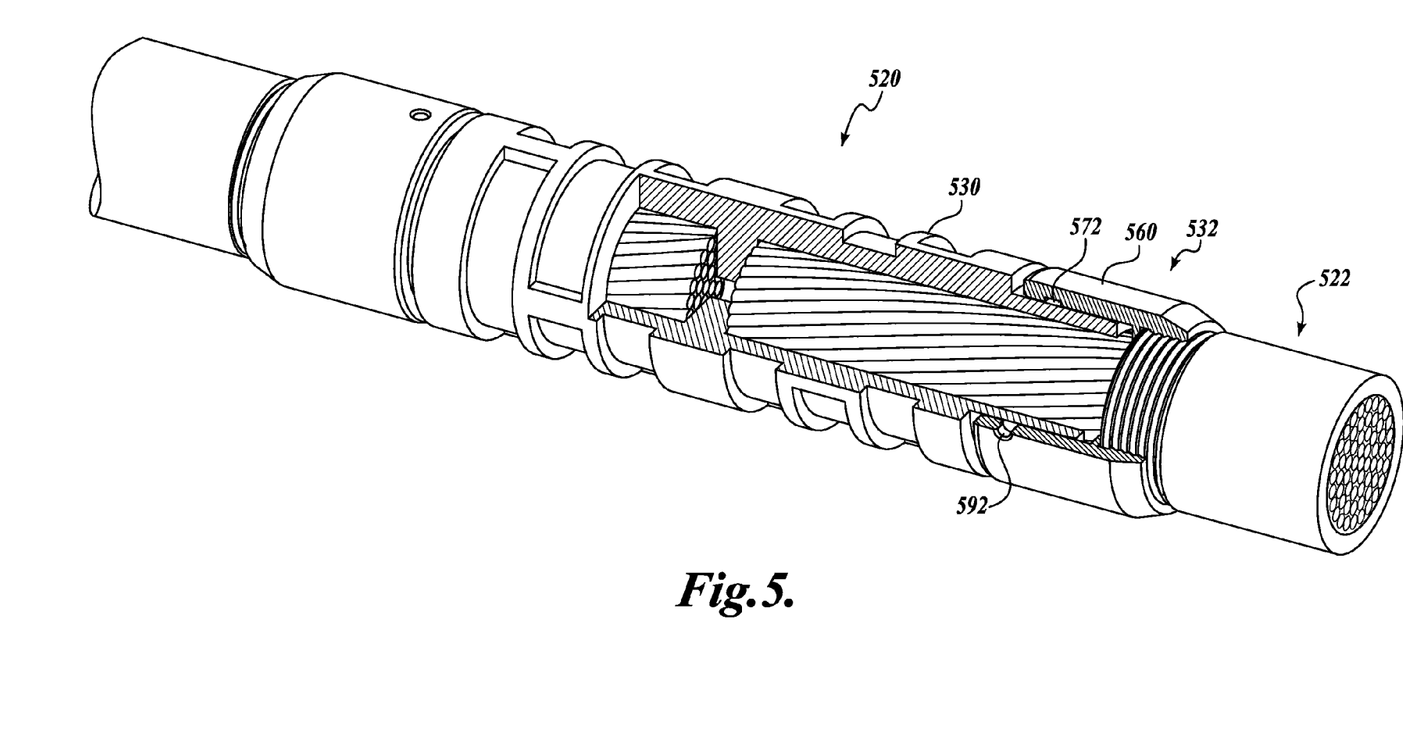
FIG. 5 is a perspective, partial cut-away view of a third embodiment of a cable splice connection assembly formed in accordance with the present disclosure, having sealing mechanisms formed in accordance with a third embodiment of the present disclosure.

FIG. 5 depicts a third embodiment of a cable connection assembly 520 shown in partial cross-section. The cable connection assembly 520 is substantially identical to the cable connection assembly 420 described above with reference to FIG. 4 except for the differences hereinafter described with reference to the first collar assembly 532. The first collar assembly 532 includes an inlet port 592 formed in the main body 530 near the first end of the main body 530. A first annular groove 572 is formed on the interior of the main body 530 in alignment with the inlet port 592. An adhesive can be injected into the inlet port 592 to spread around the interior circumference of the main body 530 through the first annular groove 572 to form a seal between the exterior of the main body 530 and the interior of the first collar 560. Rather than an annular groove 572, the main body 30 may also include a partial annular groove, a thread, or a roughened surface having increased surface area.

Figure 6:
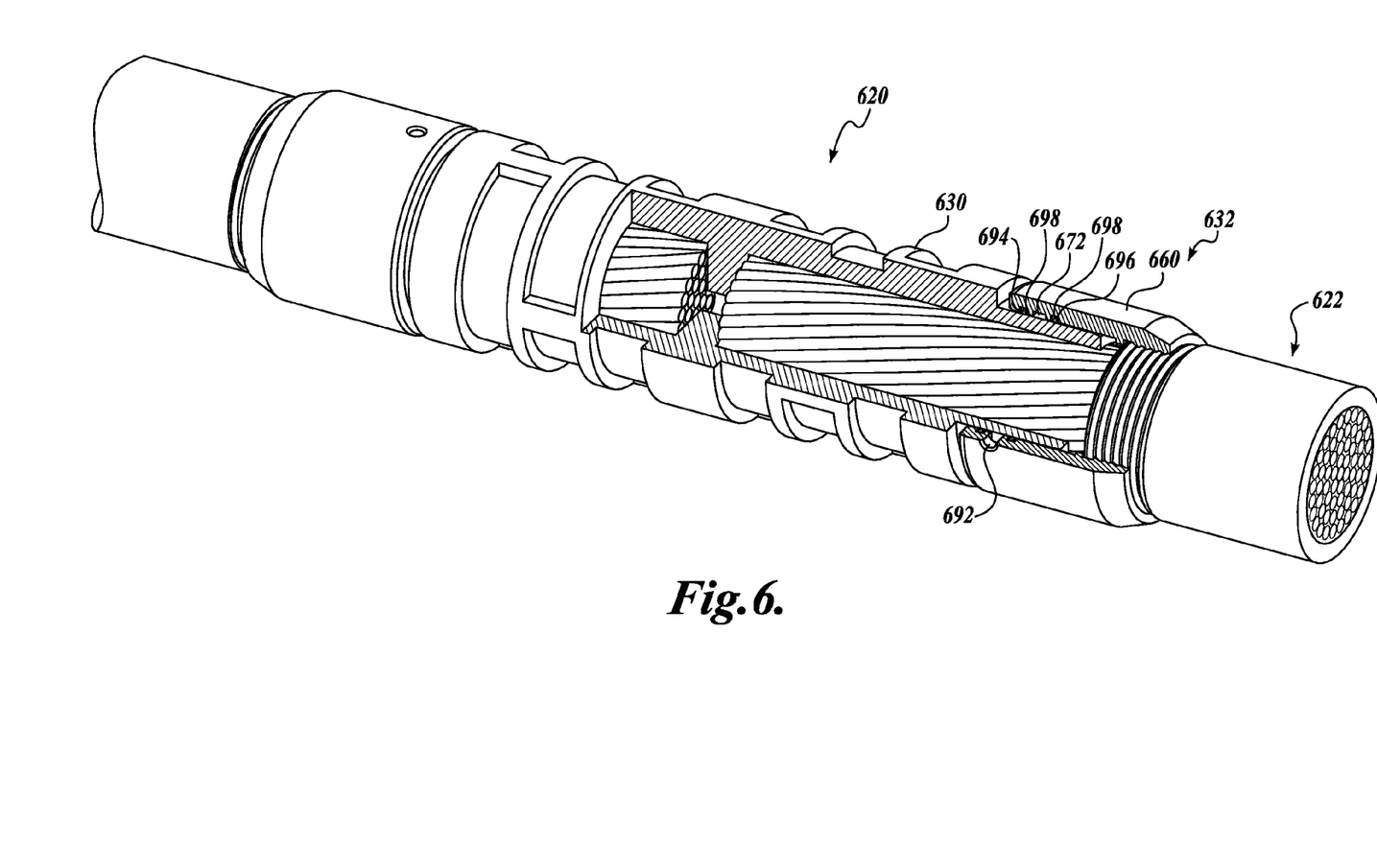
FIG. 6 is a perspective, partial cut-away view of a fourth embodiment of a cable splice connection assembly formed in accordance with the present disclosure, having sealing mechanisms formed in accordance with a fourth embodiment of the present disclosure.

FIG. 6 depicts a fourth embodiment of a cable connection assembly 620 shown in partial cross-section. The cable connection assembly 620 is substantially similar to the cable connection assembly 520 described above with reference to FIG. 5 except for the differences hereinafter described with reference to the first collar assembly 632. The first collar assembly 632 includes second and third annular grooves 694 and 696 formed on the interior of the main body 630 on each side of a first annular groove 638. O-rings 698 are received within the second and third annular grooves 694 and 696 to form an annular sealed region around the first annular groove 672. As such, when adhesive is injected into the inlet port 692, the adhesive does not spread axially along the interior of the main body 630 past the O-rings 698 received within the second and third annular grooves 694 and 696.

Figure 7:
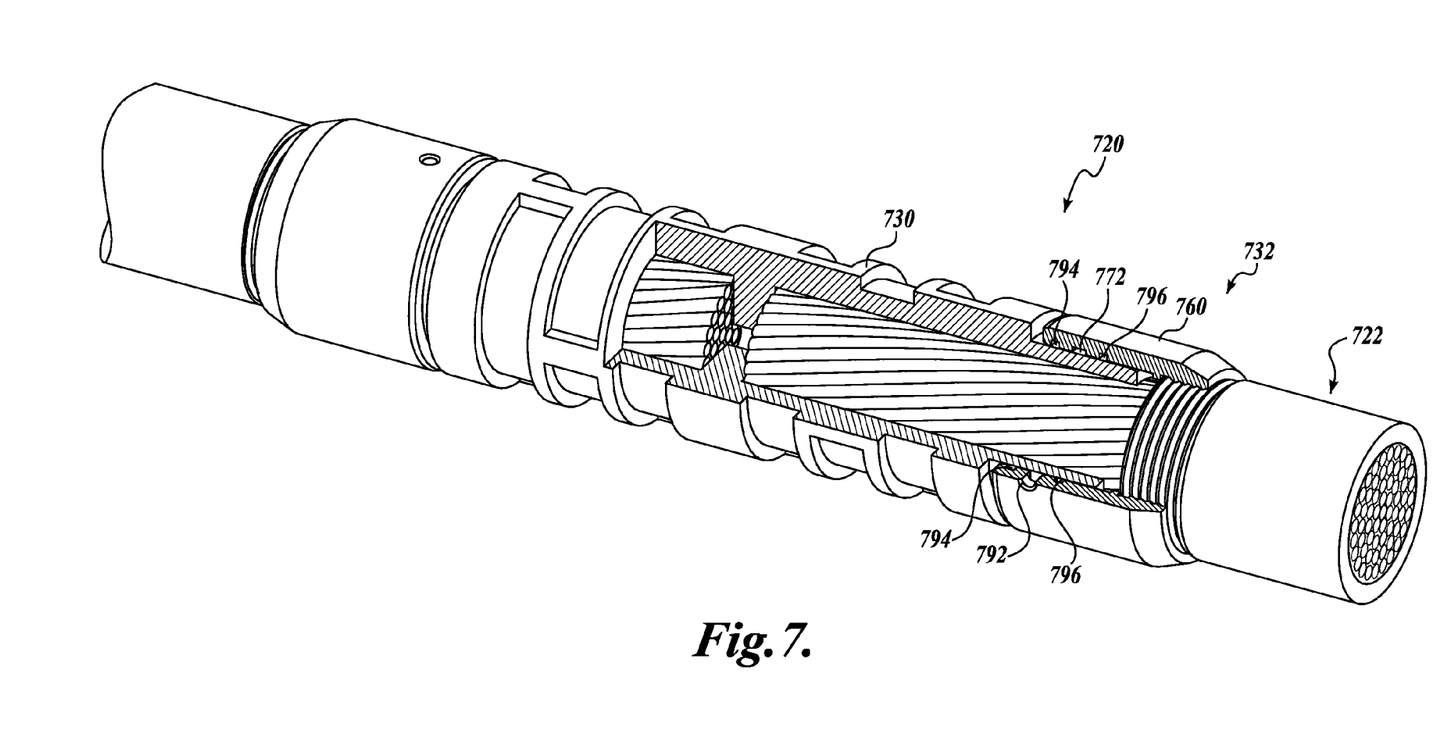
FIG. 7 is a perspective, partial cut-away view of a fifth embodiment of a cable splice connection assembly formed in accordance with the present disclosure, having sealing mechanisms formed in accordance with a fifth embodiment of the present disclosure.

FIG. 7 depicts a fifth embodiment of a cable connection assembly 720 shown in partial cross-section. The cable connection assembly 720 is substantially identical to the cable connection assembly 620 described above with reference to FIG. 6 except for the differences hereinafter described with reference to the first collar assembly 732. The first collar assembly 732 includes second and third annular grooves 794 and 796 formed on the interior of the main body 730 on each side of the first annular groove 772. However, unlike the embodiment depicted in FIG. 6, the second and third annular grooves 794 and 796 do not receive O-rings therein in the embodiment of FIG. 7. Rather, the second and third annular grooves 794 and 796 act as overflow/venting channels for the adhesive when it is injected into the inlet port 792 and it travels within the first annular groove 772. Instead of annular grooves 794 and 796, the main body 730 may also include partial annular grooves, threads, or roughened surfaces having increased surface areas.

Figure 8:
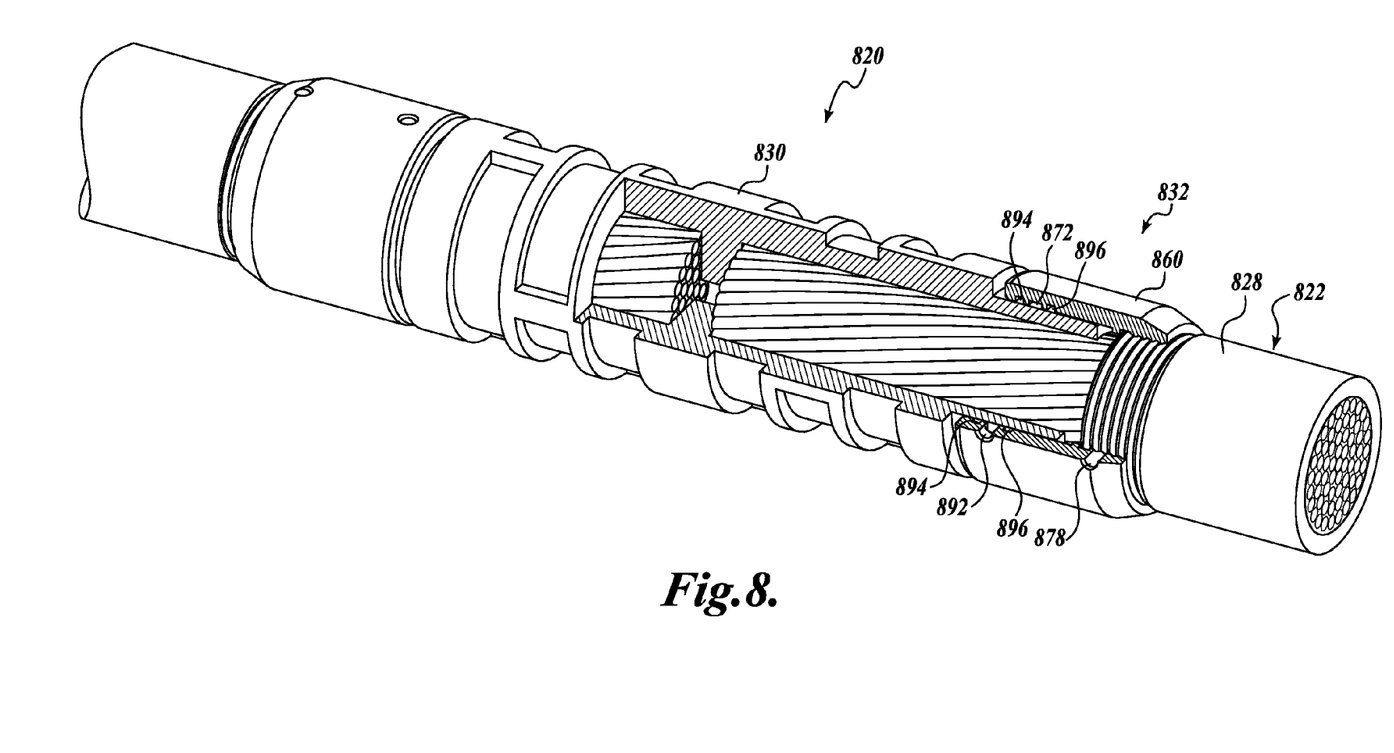
FIG. 8 is a perspective, partial cut-away view of a sixth embodiment of a cable splice connection assembly formed in accordance with the present disclosure, having sealing mechanisms formed in accordance with a sixth embodiment of the present disclosure.

FIG. 8 depicts a sixth embodiment of a cable connection assembly 820 shown in partial cross-section. The cable connection assembly 820 is substantially identical to the cable connection assembly 620 described above with reference to FIG. 6 except for the differences hereinafter described with reference to the first collar assembly 832. The main body 830 includes a second inlet port 878 formed near the first end of the main body 830. An adhesive is injected into the second inlet port 878 to seal the threaded connection between the insulation layer 828 and the main body 830 when the adhesive cures.

In accordance with the embodiments described herein, a plurality of small through holes (not shown) may be formed within the main body of any of the cable connection assemblies described above for allowing venting and necessary bleed out of the adhesive when it is injected within an injection through hole. The holes may be spaced radially around the main body to provide a visual indicator that the adhesive has spread around the entire inner circumference of the main body when the adhesive bleeds out of the holes.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A cable splice connection assembly for coupling a first cable to a second cable, the cable connection assembly comprising:
    (a) a main body having first and second ends and defining an inner cavity and an outer circumference, the first end configured to receive at least a portion of a first cable therein, and the second end configured to receive at least a portion of a second cable therein; and
    (b) a first engagement mechanism configured to couple the main body to a first cable having an outer circumference, wherein the first engagement mechanism comprises:
        (i) a first collar assembly disposed at the first end of the main body, the first collar assembly having an inner circumference and a first threaded bore in a first end of the first collar assembly to engage corresponding threads disposed on an exterior surface of the first cable; and
        (ii) a cable seal, wherein the cable seal includes an adhesive seal bonded to both a surface of the first cable and a surface of the first collar assembly, wherein the adhesive seal extends around the entire outer circumference of the first cable and the entire inner circumference of the first collar assembly to prevent fluids from passing between the cable and the first collar assembly at the adhesive seal, and wherein the cable seal is between the first threaded bore and the corresponding threads disposed on the exterior surface of the first cable.

2. The assembly of claim 1, further comprising a second collar assembly disposed at the second end of the main body.

3. The assembly of claim 2, further comprising a collar seal between the first collar assembly and the first end of the main body.

4. The assembly of claim 3, wherein the collar seal includes at least one annular groove in the first collar assembly or the main body.

5. The assembly of claim 3, wherein the collar seal includes at least one O-ring seal disposed in the at least one annular groove.

6. The assembly of claim 3, wherein the collar seal includes at least two annular grooves in the second end of the first collar assembly.

7. The assembly of claim 3, wherein the collar seal includes at least three annular grooves in the second end of the first collar assembly.

8. The assembly of claim 3, wherein the collar seal includes an adhesive seal.

9. The assembly of claim 8, wherein the adhesive of the collar seal is selected from the group consisting of acrylic, epoxy, structural, temperature resistant, thermosetting adhesives.

10. The assembly of claim 3, wherein the collar seal includes an inlet port for delivering adhesive to the collar seal.

11. The assembly of claim 1, wherein the first engagement mechanism is adapted to releasably couple the main body to the first cable.

12. The cable connection assembly of claim 1, wherein the first threaded bore includes an annular groove.

13. The assembly of claim 1, wherein the adhesive of the cable seal is selected from the group consisting of acrylic, epoxy, structural, temperature resistant, thermosetting adhesives.

14. The assembly of claim 1, wherein the first engagement mechanism includes an inlet port for delivering adhesive to the first engagement mechanism.

15. A method for coupling a first cable to a second cable, the method comprising:
   (a) providing a cable connection assembly including a main body defining an outer circumference and an inner cavity having first and second ends, the first end configured to receive at least a portion of a first cable therein, and the second end configured to receive at least a portion of a second cable therein;
   (b) providing the first cable having a first end and an outer circumference;
   (c) providing the second cable having a first end;
   (d) inserting the first end of the first cable into the first end of the inner cavity of the main body;
   (e) securing the first end of the first cable within the first end of the inner cavity of the main body with the first engagement mechanism, wherein the first engagement mechanism includes a first collar assembly disposed at the first end of the main body, the first collar assembly having an inner circumference and a first threaded bore in a first end of the first collar assembly configured to engage corresponding threads disposed on an exterior surface of the first cable;
   (f) sealing the first end of the first cable in the first engagement mechanism using an adhesive, wherein the adhesive is bonded to both a surface of the first cable and a surface of the first collar assembly, wherein the adhesive seal extends around the entire outer circumference of the first cable and the entire inner circumference of the first collar assembly to prevent fluids from passing between the first cable and the first collar assembly at the adhesive, and wherein the adhesive is between the first threaded bore and the corresponding threads disposed on the exterior surface of the first cable;
   (g) inserting the first end of the second cable into the second end of the inner cavity of the main body; and
   (h) sealing the first end of the second cable in the second end of the inner cavity of the main body using an adhesive.

16. The method of claim 15, further comprising applying an adhesive to at least one of the first end of the inner cavity or the first end of the first cable before inserting the first end of the first cable into the first end of the inner cavity.

17. The method of claim 15, further comprising applying an adhesive to at least one of the first end of the inner cavity or the first end of the first cable after inserting the first end of the first cable into the first end of the inner cavity.

18. The method of claim 15, further comprising applying an adhesive to at least one of the second end of the inner cavity or the first end of the second cable before inserting the first end of the second cable into the second end of the inner cavity.

19. The method of claim 15, further comprising applying an adhesive to at least one of the second end of the inner cavity or the first end of the second cable after inserting the first end of the second cable into the second end of the inner cavity.

* * * * *